(12) United States Patent
Siret et al.

(10) Patent No.: US 7,722,985 B2
(45) Date of Patent: May 25, 2010

(54) LITHIUM BATTERY OPERATING AT VERY LOW TEMPERATURE

(75) Inventors: Clemence Siret, Bruges (FR); Cecile Teissier, Bruges (FR); Frederic Castaing, Gradignan (FR); Philippe Biensan, Carignan de Bordeaux (FR)

(73) Assignee: SAFT, Bagnolet (FR)

(*) Notice: Subject to any disclaimer, the term of this patent is extended or adjusted under 35 U.S.C. 154(b) by 117 days.

(21) Appl. No.: 11/291,899

(22) Filed: Dec. 2, 2005

(65) Prior Publication Data
US 2006/0154116 A1    Jul. 13, 2006

(30) Foreign Application Priority Data
Dec. 17, 2004    (FR) .................................. 04 13495

(51) Int. Cl.
H01M 6/04    (2006.01)
H01M 6/16    (2006.01)

(52) U.S. Cl. ................. 429/188; 429/199; 429/326

(58) Field of Classification Search ............... 429/200, 429/231.1, 303, 313, 314, 326, 329, 330, 429/331, 332, 334, 337, 393
See application file for complete search history.

(56) References Cited

U.S. PATENT DOCUMENTS 6,399,255 B2 * 6/2002 Herreyre et al. ............. 429/331

2001/0019800 A1    9/2001 Herreyre et al.
2001/0053485 A1 * 12/2001 Shibuya et al. ............. 429/303

FOREIGN PATENT DOCUMENTS

| EP | 0 548 449 A1 | 6/1993 |
| EP | 1009057 A1 | 6/2000 |
| EP | 1 150 374 A1 | 10/2001 |
| EP | 1 311 018 A1 | 5/2003 |
| JP | 10144346 | 5/1998 |
| JP | 10247519 | 9/1998 |
| JP | 2004014134 | 1/2004 |

* cited by examiner

Primary Examiner—Dah-Wei D Yuan
Assistant Examiner—Adam A Arciero
(74) Attorney, Agent, or Firm—Sughrue Mion, PLLC (57) ABSTRACT

A subject of the invention is a mixture of solvents for the electrolyte of a lithium battery, which mixture of solvents comprises with respect to the volume of said mixture,
  50 to 95% by volume of a linear ester of a $C_2$ to $C_8$ saturated acid, and
  5 to 50% by volume of a $C_3$ to $C_6$ saturated cyclic carbonate and a $C_3$ to $C_6$ saturated linear carbonate, only one of the two carbonates being substituted by at least one halogen atom.

The invention is also aimed at a lithium battery comprising a liquid electrolyte having this composition. The battery according to the invention is able to operate at temperatures which can range up to approximately −60° C.

A subject of the invention is also the use of a battery according to the invention at temperatures which can range up to −60° C.

23 Claims, 10 Drawing Sheets

LITHIUM BATTERY OPERATING AT VERY LOW TEMPERATURE

TECHNICAL FIELD

The present invention relates to a lithium battery which is able to operate at very low temperatures (up to −60° C.).

PRIOR ART

A lithium battery possesses an electrochemical stack which comprises a positive electrode comprising an electrochemically active material capable of inserting lithium into its structure (generally an oxide of a transition metal, usually lithiated), and a negative electrode that supplies the lithium ions. The electrodes are placed on either side of a separator membrane that is generally made of polyolefin. The electrochemical stack is impregnated with a non-aqueous solid or liquid electrolyte. The electrolyte contains a lithium salt dissolved in a mixture of organic solvents.

The negative electrode of a lithium battery can be constituted by a carbon-containing material, which has the property of inserting lithium during charging and removing the lithium during discharging. During charging, the lithium ions are reduced to lithium at the negative electrode and the lithium migrates and inserts itself into the structure of the carbon-containing material.

When the charging of such an battery takes place at a very low temperature (from −20° C.), the formation of a lithium deposit at the surface of the negative electrode is sometimes observed, due to the increase in the polarization of this electrode. The lower the temperature and the higher the discharge rate the greater is this deposit. It is harmful to the battery life because it reduces the reversible capacity of the battery. On the other hand its development creates a risk for the user because it can cause a perforation of the separator thus leading to an internal short-circuit of the battery.

It is sought to reduce the polarization of the negative electrode when the battery operates at very low temperatures and a battery is sought which does not have this drawback.

The document EP-A-1009057 describes a lithium battery which can operate at −20° C. and −30° C. It is characterized by a solvent comprising a saturated cyclic carbonate, an unsaturated cyclic carbonate and at least one linear ester of a saturated monocarboxylic acid and by a negative electrode having a fluorine-free binder.

The document JP 10144346 describes a lithium battery containing as electrolyte solvent a monofluorinated derivative of dimethyl carbonate which can be mixed with other non-aqueous solvents, the number and nature of which are not specifically limited. This battery has a good performance when discharging at −10° C.

The document JP 10247519 describes a lithium battery containing a lithium salt of the $LiN(C_nF_{2n+1}SO_2)_2$ type with n=1, 2, 3 or 4 and/or of the $LiC(C_mF_{2m+1}SO_2)_3$ type with m=1, 2, 3 or 4, dissolved in a mixture of a saturated cyclic carbonate, substituted or not by one or more halogen atoms and a linear carbonate substituted or not by one or more halogen atoms. This electrolyte composition has the advantage of improving the conservation of the battery charge, in particular during extended storage of the battery at high temperature (60° C.).

The publication by Y. Sasaki et al. of 23-25 April 2003 during the 3$^{rd}$ Franco-Japanese seminar on organic chemistry and the electrochemistry of fluorine, entitled "Physical and electrolytic properties of monofluorinated dimethyl carbonate" describes how a mixture of monofluorinated dimethyl carbonate and ethylene carbonate is capable of being an electrolyte of a lithium battery cyclically operating at 25° C.

The document EP-A-0 548 449 describes a mixture of a saturated cyclic carbonate, a saturated linear carbonate and an aliphatic carboxylate (i.e. an ester) for the electrolyte of a lithium battery. This battery has good performance when discharging at −10° C.

The document EP-A-1 150 374 describes a lithium battery with gel electrolyte, the solvent of which is constituted by a mixture of ethylene carbonate substituted by one or more halogen atom(s) and one or more cyclic carbonate(s) and/or one or more linear carbonate(s). Such a battery has good performance when discharging at −20° C.

The document JP 2004-014134 describes an electrolyte comprising a saturated linear carbonate substituted by fluorine, for example monofluorinated dimethyl carbonate, in a mixture with other non-aqueous solvents, the number and nature of which are not specifically limited. A battery comprising such an electrolyte has a high yield when charging and discharging and its performance, during prolonged storage at high temperature, is not changed.

None of the documents describes the battery according to the invention.

SUMMARY OF THE INVENTION

The invention provides a mixture of solvents for the electrolyte of a lithium battery, which mixture of solvents comprises with respect to the volume of said mixture, 50 to 95% by volume of a linear ester of a saturated $C_2$ to $C_8$ acid, and 5 to 50% by volume of a $C_3$ to $C_6$ saturated cyclic carbonate and a $C_3$ to $C_6$ saturated linear carbonate, only one of the two carbonates being substituted by at least one halogen atom.

The battery according to the invention is capable of operating at temperatures which can range up to approximately −60° C.

A subject of the invention is also the use of a battery according to the invention at temperatures which can range up to −60° C.

DETAILED DESCRIPTION OF THE EMBODIMENTS OF THE INVENTION

The purpose of the present invention is to reduce the polarization of the negative electrode of a lithium battery during the charging of this battery at very low temperatures, i.e. at a temperature lower than −20° C. For this purpose the invention proposes a mixture of organic solvents for the electrolyte of a lithium battery with a carbon anode the performance of which when charging at very low temperatures (−20° C. to −60° C.) is improved in relation to that of a conventional lithium battery.

The present invention provides a ternary mixture of organic solvents for the electrolyte of a lithium battery, which mixture of solvents comprises with respect to the volume of said mixture, 50 to 95% by volume of a linear ester of a $C_2$ to $C_8$ saturated acid, and 5 to 50% by volume of a $C_3$ to $C_6$ saturated cyclic carbonate and a $C_3$ to $C_6$ saturated linear carbonate, only one of the two carbonates being substituted by at least one halogen atom.

According to one embodiment, the substituted carbonate is monosubstituted.

According to one embodiment, the at least one halogen atom is fluorine.

By linear ester of a saturated acid or saturated aliphatic carboxylate is generally meant a compound of formula R—CO—OR' in which R is H or an alkyl group and R' is an alkyl group such as $CH_3$ (methyl), $CH_3$—$CH_2$ (ethyl), etc. Said linear ester of a saturated aliphatic monocarboxylic acid is for example a formate if R is H, an acetate if R is $CH_3$, a propionate if R is $CH_3$—$CH_2$, a butyrate if R is $CH_3$—$(CH_2)_2$, a valeriate if R is $CH_3$—$(CH_2)_3$, etc.

Said linear ester is for example chosen from an acetate, a butyrate and a propionate. An ethyl acetate, a methyl acetate, a propyl acetate, an ethyl butyrate, a methyl butyrate, a propyl butyrate, an ethyl propionate, a methyl propionate, a propyl propionate will be chosen for example.

According to one embodiment, said linear ester is ethyl acetate (EA).

Said saturated cyclic carbonate is chosen for example from propylene carbonate, ethylene carbonate and butylene carbonate.

According to one embodiment, said saturated cyclic carbonate is ethylene carbonate (EC).

Said saturated linear carbonate is for example chosen from dimethyl carbonate, diethyl carbonate, methyl ethyl carbonate and methyl propyl carbonate.

According to one embodiment, said linear cyclic carbonate is dimethyl carbonate (DMC).

According to one embodiment, the proportion by volume of linear ester is 60 to 85% of the mixture of solvents.

The proportion by volume in the mixture of said saturated cyclic carbonate, whether it is substituted or not by one or more halogen atoms, is preferably 3 to 30% in relation to the total volume of solvent. Preferably, the proportion of saturated cyclic carbonate, substituted or not by one or more halogen atoms, is 10 to 20% in relation to the total volume of solvent.

The proportion by volume in the mixture of said saturated linear carbonate, whether it is substituted or not by one or more halogen atoms, is preferably 3 to 30% in relation to the total volume of solvent. Preferably, the proportion of saturated linear carbonate, substituted or not by one or more halogen atoms, is from 5 to 25% in relation to the total volume of solvent.

According to one embodiment, the mixture of solvents is constituted by ethylene carbonate, monofluorinated dimethyl carbonate (F1DMC) and ethyl acetate in proportions by volume of 10-20%, 20-30% and 50-70% respectively.

According to one embodiment, the mixture of solvents is constituted by monofluorinated ethylene carbonate (F1EC), dimethyl carbonate and ethyl acetate in proportions by volume of 10-20%, 20-30% and 50-70% respectively.

The mixture of solvents preferably does not contain unsaturated cyclic carbonate. The compounds such as vinylene carbonate (VC) and its derivatives, in particular propylidene carbonate, ethylidene ethylene carbonate, isopropylidene ethylene carbonate belong to the family of unsaturated cyclic carbonates. By derivatives of vinylene carbonate is meant compounds having at least one unsaturated bond to one carbon atom of the ring, such as for example, propylidene carbonate, ethylidene ethylene carbonate (or 4-ethylidene 1-3 dioxolane 2 one), or isopropylidene ethylene carbonate (or 4-isopropylidene 1-3 dioxolane 2 one). Preferably, the quantity of vinylene carbonate will be less than 0.1% by volume, preferably nil.

A lithium salt is dissolved in the mixture of solvents according to the invention. The lithium salt is for example chosen from lithium hexafluorophosphate ($LiPF_6$), lithium perchlorate ($LiClO_4$), lithium hexafluoroarsenate ($LiAsF_6$), lithium tetrafluoroborate ($LiBF_4$), lithium trifluoromethane sulfonate $LiCF_3SO_3$, lithium trifluoromethane sulfonimide $LiN(CF_3SO_2)_2$ (LiTFSI) or lithium trifluoromethane sulfonemethide $LiC(CF_3SO_2)_3$ (LiTFSM). The mixture of solvents to which lithium salt is added constitutes the electrolyte of the lithium battery.

The battery according to the invention comprises at least one positive electrode, at least one negative electrode containing a binder and an electrochemically active material which is a carbon capable of inserting lithium ions and a liquid electrolyte as described above.

The binder of the negative electrode preferably comprises a non-fluorinated polymer chosen from: styrene and butadiene copolymer, acrylonitrile and butadiene copolymer, acrylic acid homopolymer, carboxymethyl cellulose and mixtures thereof.

According to one embodiment, the polymer is a mixture of a copolymer of styrene and butadiene and carboxymethyl cellulose.

Preferably, the proportion by weight of the styrene and butadiene copolymer is comprised between 30 and 70% of said binder and the proportion by weight of carboxymethyl cellulose is comprised between 30 and 70% of said binder.

A subject of the present invention is also the use of such a battery at temperatures ranging up to −60° C.

Other characteristics and advantages of the present invention will become apparent in the following embodiment examples, given by way of non-limitative example.

EXAMPLES

Production of the Batteries

Six batteries of the button type each comprising as work electrode, a graphite negative electrode, as counter electrode and reference electrode of metallic lithium, and a polypropylene separator. A mixture of carboxymethyl cellulose and a styrene and butadiene copolymer (CMC/SBR) is used as binder of the negative active material. The six batteries differ in the composition of their electrolyte. Six mixtures of solvents are prepared to which $LiPF_6$, dissolved at a concentration of 1 mole.$L^{-1}$, is added as lithium salt. The composition of the six mixtures of solvents is shown in Table 1 below.

A polypropylene separator is placed between the electrodes in order to form an electrochemical stack.

The electrochemical stack is impregnated with electrolyte. The battery cases are closed.

TABLE 1

Composition of the mixtures of solvents

| Reference | Composition of the mixture of solvents |
|---|---|
| Battery 1a | EC/DMC/EA (15/25/60) + 2% VC |
| Battery 2a | F1EC/DMC/EA (15/25/60) without VC |
| Battery 3a | EC/F1DMC/EA (15/25/60) without VC |
| Battery 4a | EC/DMC/DEC (40/40/20) + 1% VC |
| Battery 5a | EC/DMC/DEC/EMC (25/25/25/25) + 1% VC |
| Battery 6a | EC/DMC/DEC/EMC (20/20/20/40) + 1% VC |

The percentages of solvent are percentages by volume in relation to the total volume of solvents.

In the batteries 1a, 4a, 5a and 6a containing vinylene carbonate, the latter is added after having carried out the mixing of the other solvents of the electrolyte. The proportion of vinylene carbonate shown is a mass proportion in relation to 100% of the weight of the mixture of the other solvents.

Tests At Low Temperature

Figure 1:
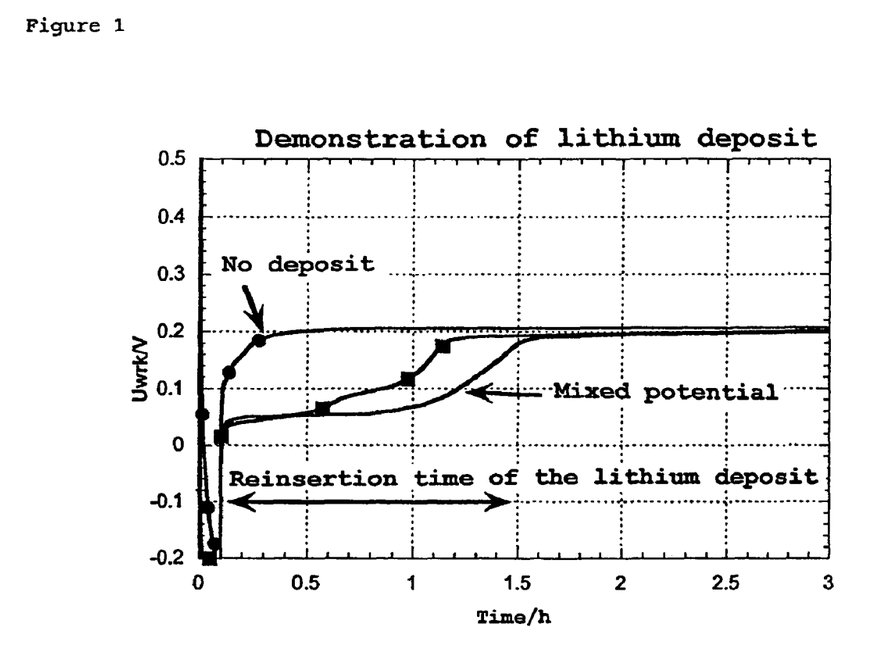
FIG. 1 is a diagram illustrating the principle of the charging tests at a low temperature.
Figure 2A:
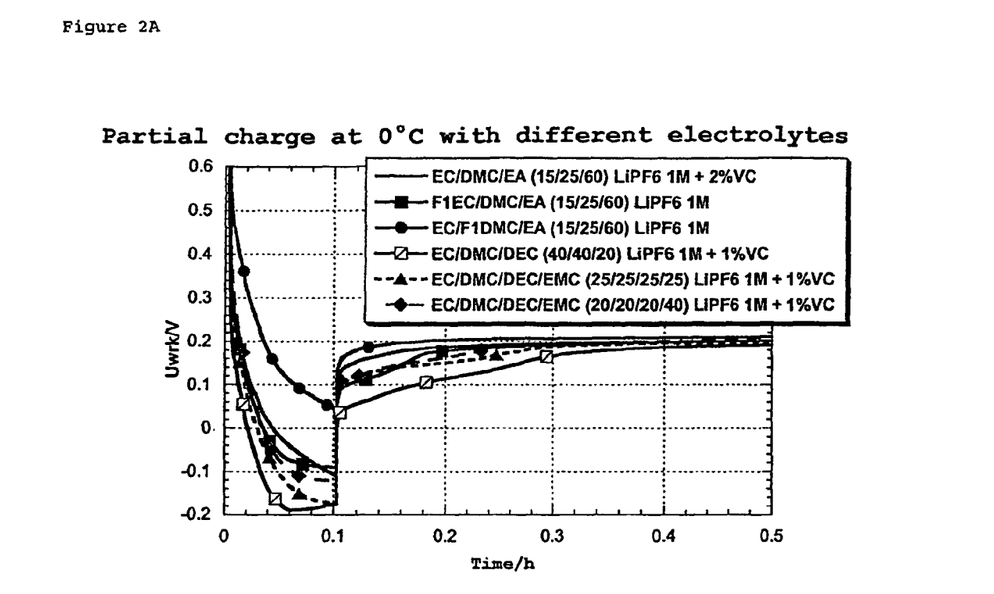
FIG. 2A represents the variation in the voltage of batteries, filled with different electrolytes, after a partial charging to 10% of capacity, at a rate of C, at 0° C.
Figure 2B:
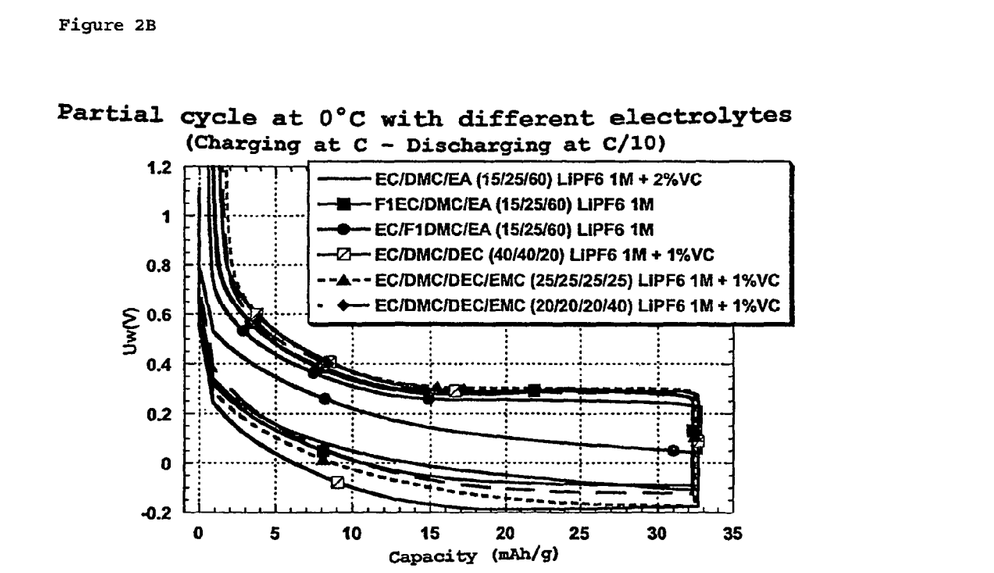
FIG. 2B represents the variation in the voltage of these batteries during a partial cycle at 0° C. (charging at C—discharging at C/10).
Figure 3A:
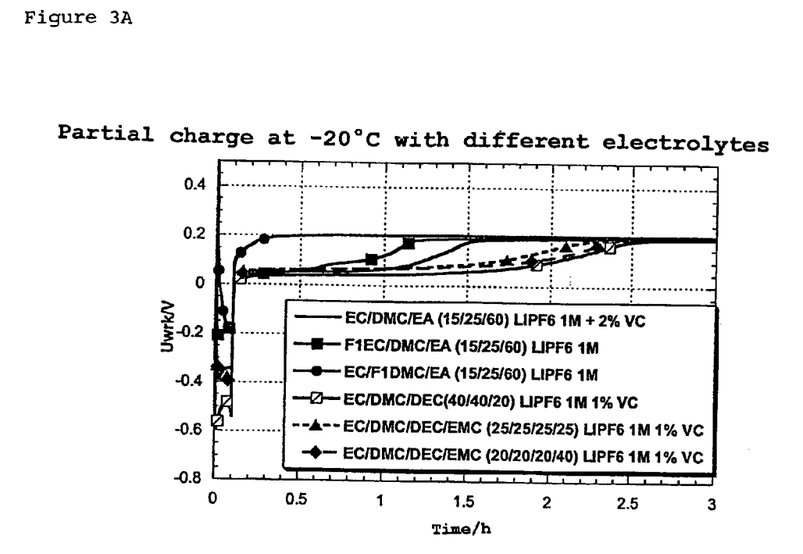
FIG. 3A represents the variation in the voltage of batteries, filled with different electrolytes, after a partial charging to 10% of capacity, at a rate of C, at −20° C.
Figure 3B:
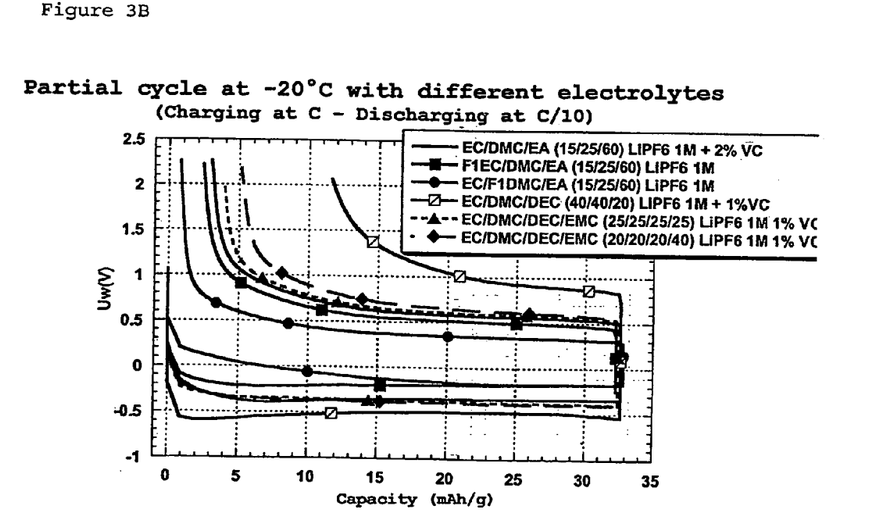
FIG. 3B represents the variation in the voltage of these batteries during a partial cycle at −20° C. (charging at C—discharging at C/10).
Figure 4A:
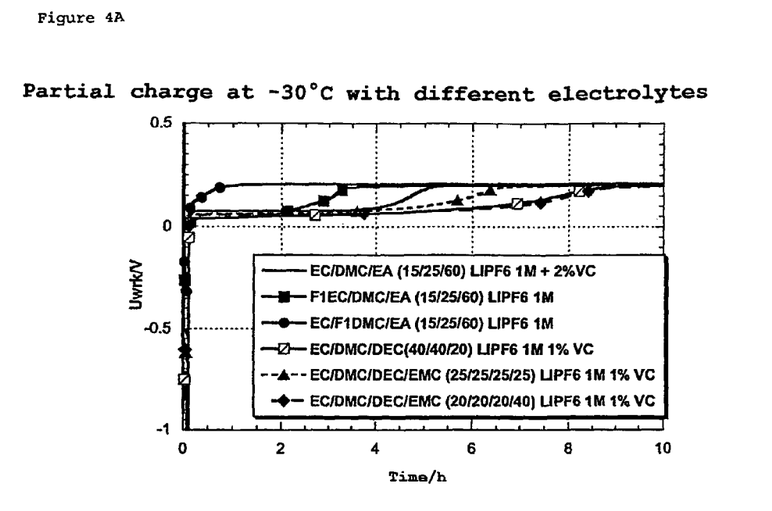
FIG. 4A represents the variation in the voltage of batteries, filled with different electrolytes, after a partial charging to 10% of capacity, at a rate of C, at −30° C.
Figure 4B:
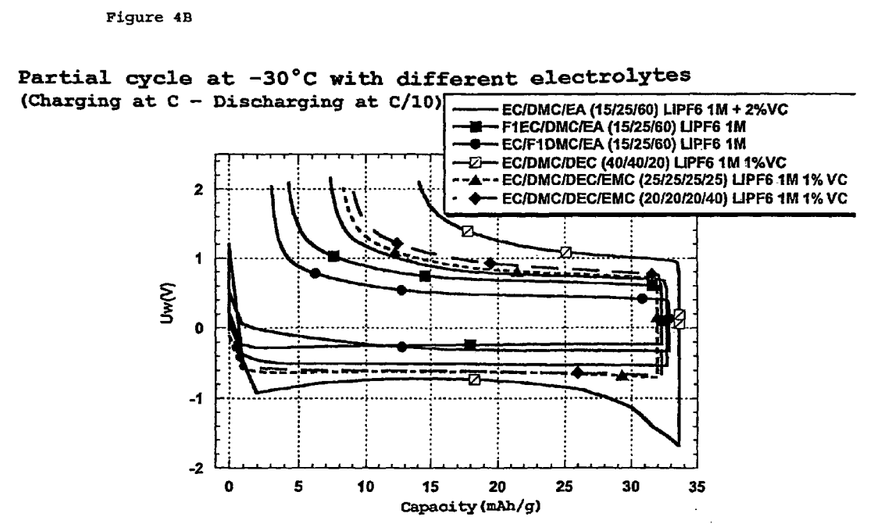
FIG. 4B represents the variation in the voltage of these batteries during a partial cycle at −30° C. (charging at C—discharging at C/10).
Figure 5A:
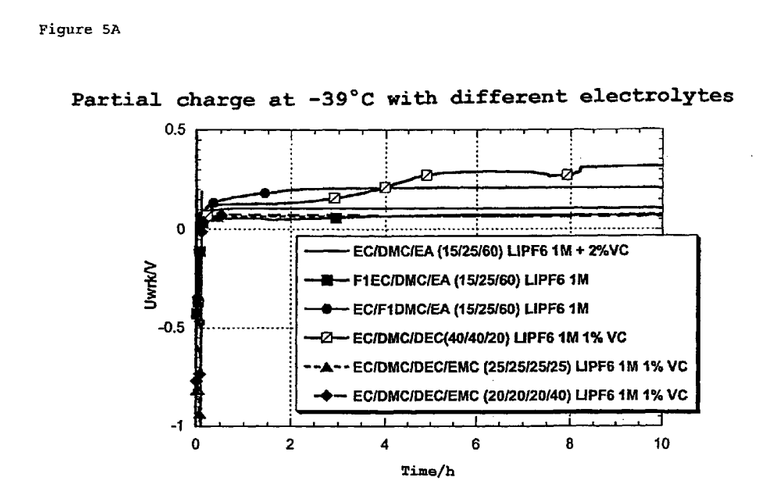
FIG. 5A represents the variation in the voltage of batteries, filled with different electrolytes, after a partial charging to 10% of capacity, at a rate of C, at −39° C.
Figure 5B:
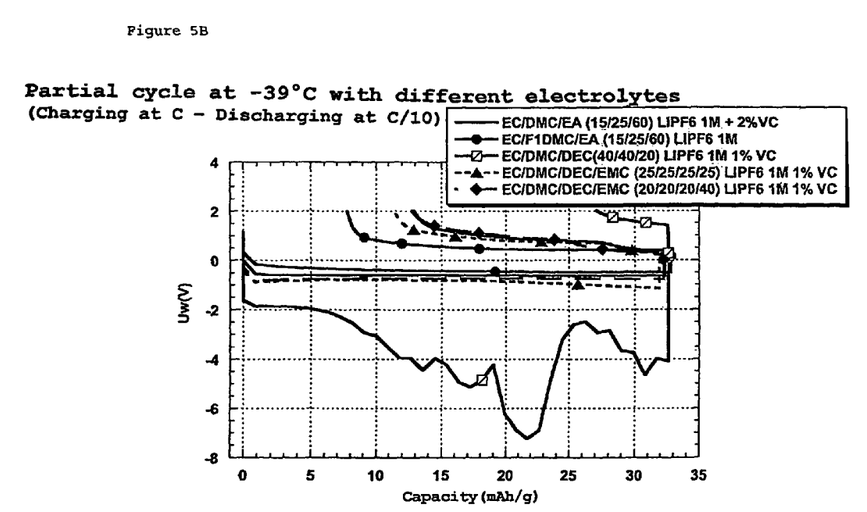
FIG. 5B represents the variation in the voltage of these batteries during a partial cycle at −39° C. (charging at C—discharging at C/10).

After an electrochemical forming at 60° C. and a cycle at ambient temperature the batteries are tested according to an operating method, developed by the applicant, which allows the presence or absence of a metallic lithium deposit at the surface of the negative electrode to be demonstrated. The principle of this test is illustrated in FIG. 1.

The principle of this test is as follows: the batteries are subjected to partial charging to 10% of their capacity, at a rate of C, at the following temperatures: 0° C., −20° C., −30° C. and −39° C. This high rate as well as the low temperature (very weak electrolyte ionic conductivity) increases the polarization of the negative electrode, which in certain cases, causes a lithium deposit at the surface. During the relaxation which follows this partial charging, the deposited lithium is reinserted into the structure of the graphite producing a mixed potential (lithium already inserted during the charging and lithium in the course of being reinserted) as shown in FIG. 1. By following the development of the voltage, it is therefore possible to quantify the reinsertion time of the lithium into the graphite. The higher the reinsertion time, the greater the lithium deposit at the surface of the electrode.

The partial charging tests carried out on the batteries 1a-6a, (FIGS. 2A, 3A, 4A and 5A), show that the shortest lithium deposit reinsertion times are obtained for the batteries 2a and 3a filled with an electrolyte according to the invention. A reinsertion time of almost nil is obtained with the battery 3a filled with an electrolyte comprising a mixture EC/F1DMC/EA (15/25/60) without VC at the four test temperatures. This indicates for this battery the absence or the presence in a very small quantity of a lithium deposit at the surface of the negative electrode.

The batteries 1a to 6a have also undergone a partial cycle test consisting of a stage of charging at the rate of C followed by a stage of discharging at the rate of C/10. The voltages measured during the charging and discharging are represented in FIGS. 2B, 3B, 4B and 5B for the temperatures 0° C., −20° C., −30° C. and −39° C. respectively. It is noted that the difference between the charging voltage and the discharging voltage is smaller for the batteries 2a and 3a filled with an electrolyte according to the invention. This means that the batteries 2a and 3a have the lowest resistance to polarization.

The use of an electrolyte according to the invention therefore makes it possible to significantly reduce the polarization of the negative electrode.

Influence of the Presence of An Unsaturated Cyclic Carbonate On the Polarization of the Negative Electrode The influence of the presence of an unsaturated cyclic carbonate in the electrolyte on the polarization of the negative electrode has been determined. For this purpose, the batteries 7a and 8a were manufactured and tested. These batteries are filled with an electrolyte also comprising an unsaturated cyclic carbonate which is vinylene carbonate (VC). The compositions of the electrolytes of batteries 7a and 8a are shown in Table 2 below.

TABLE 2

Composition of the mixtures of solvents of batteries 7a and 8a.

| Reference | Composition of the mixture of solvents |
|---|---|
| Battery 7a | EC/F1DMC/EA (15/25/60) + 1% VC |
| Battery 8a | EC/F1DMC/EA (15/25/60) + 2% VC |

The batteries 7a and 8a were tested in comparison with the batteries 1a, 2a and 3a. The results of the tests carried out at temperatures of −30° C., −40° C., −50° C. and −60° C. are represented respectively in FIG. 6A, FIG. 7A, FIG. 8 and FIG. 9.

Figure 6A:
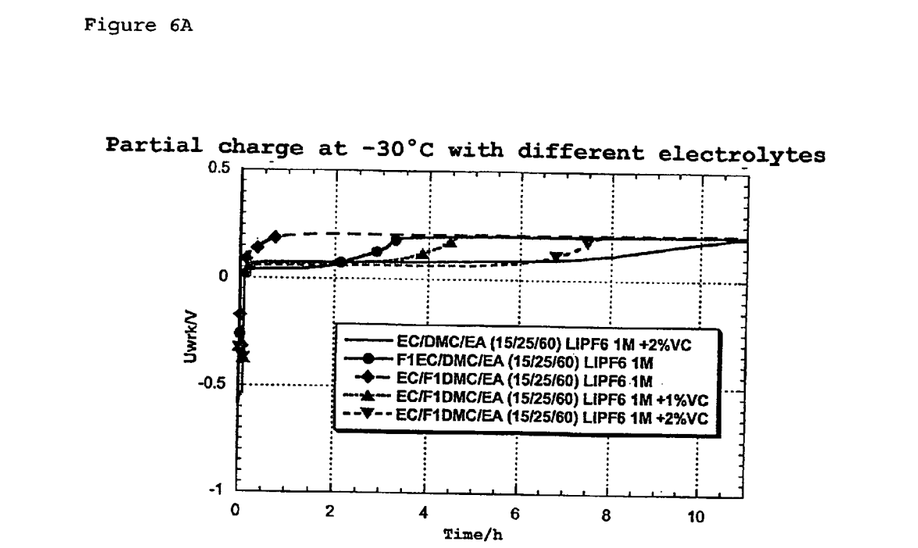
FIG. 6A represents the variation in the voltage of batteries, filled with different electrolytes also comprising vinylene carbonate, after a partial charging to 10% of capacity, at a rate of C, at −30° C.

FIG. 6A shows that the shortest lithium reinsertion times are obtained for the batteries 2a and 3a containing a carbonate monosubstituted by fluorine and not containing vinylene carbonate.

The batteries 7a and 8a containing monofluorinated dimethyl carbonate and vinylene carbonate have greater polarization than that of batteries 2a and 3a.

The battery 1a not containing carbonate monosubstituted by fluorine and containing vinylene carbonate, presents the highest polarization.

Figure 6B:
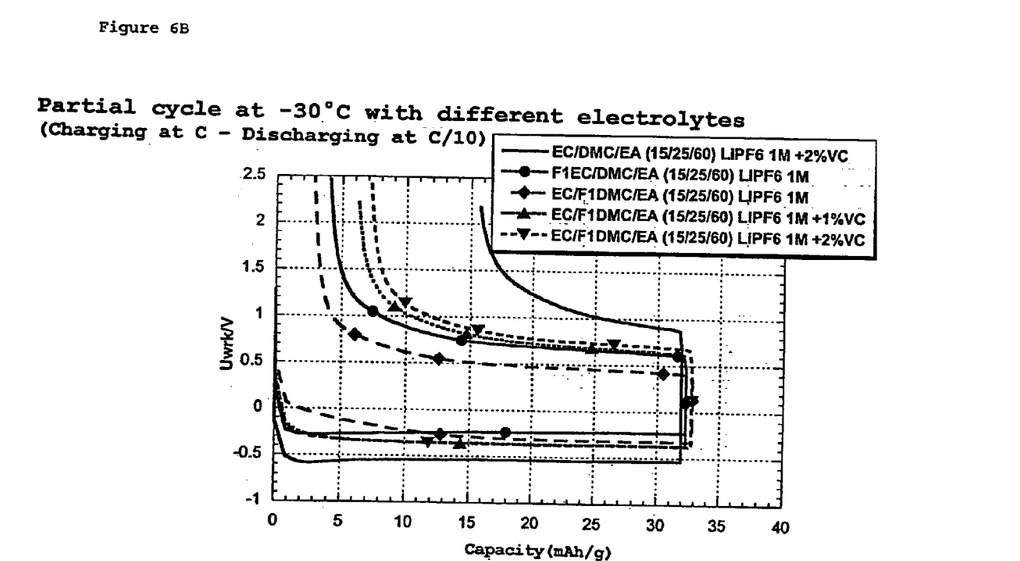
FIG. 6B represents the variation in the voltage of these batteries during a partial cycle at −30° C. (charging at C—discharging at C/10).
Figure 7A:
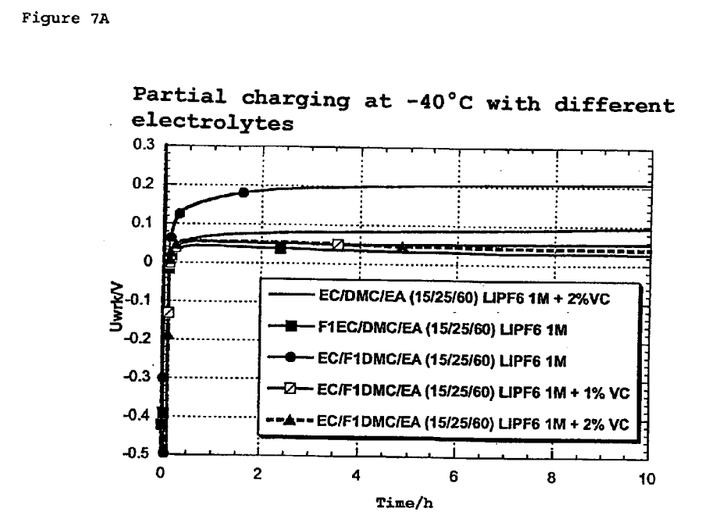
FIG. 7A represents the variation in the voltage of batteries, filled with different electrolytes also comprising vinylene carbonate, after a partial charging to 10% of capacity, at a rate of C, at −40° C.
Figure 7B:
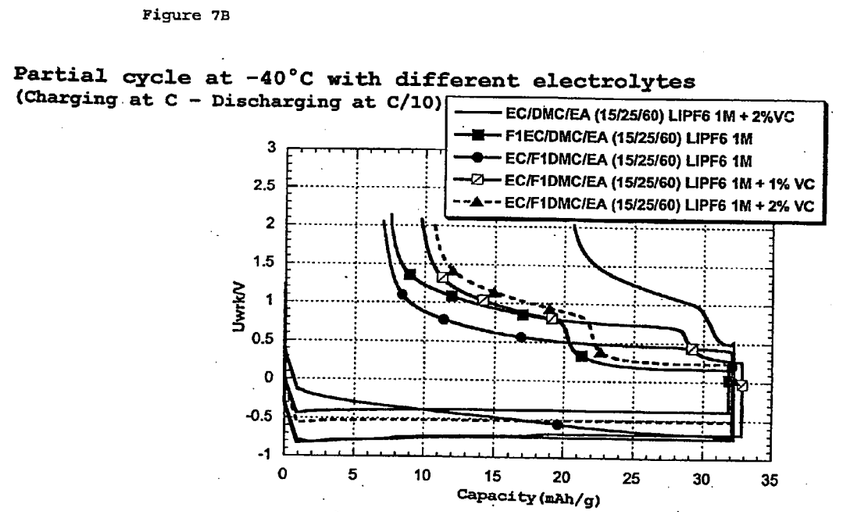
FIG. 7B represents the variation in the voltage of these batteries during a partial cycle at −40° C. (charging at C—discharging at C/10).
Figure 8:
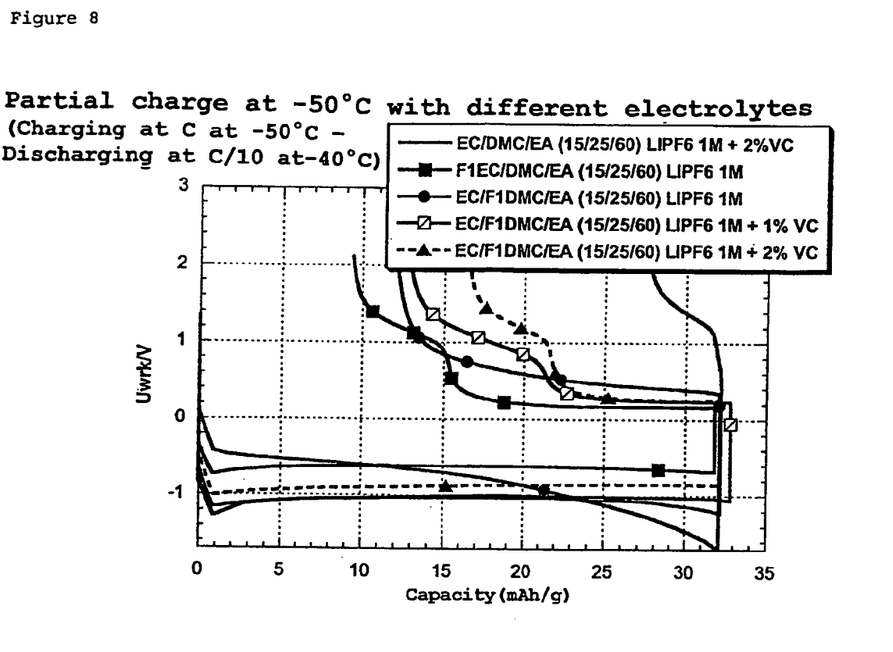
FIG. 8 represents the variation in the voltage of batteries, filled with different electrolytes also comprising vinylene carbonate, during a partial cycle (charging at C at −50° C. and discharging at C/10 at −40° C.).
Figure 9:
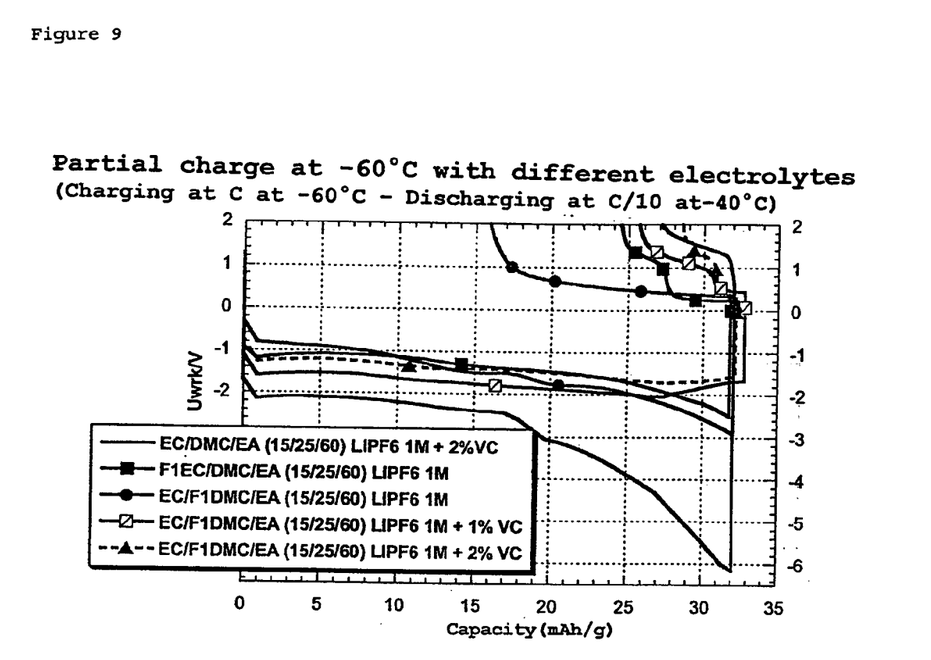
FIG. 9 represents the variation in the voltage of batteries, filled with different electrolytes also comprising vinylene carbonate, during a partial cycle (charging at C at −60° C. and discharging at C/10 at −40° C.).

These results are confirmed by the results of the partial cycle tests represented in FIG. 6B.

FIGS. 7A, 7B, 8 and 9, corresponding to tests carried out at temperatures which are even lower than those of the tests of FIGS. 6A and 6B, show that only the electrolyte of the battery 3a deposits no lithium (no mixed potential either during relaxation or during discharging) and has the highest capacity.

Amongst the other electrolytes having a lithium deposit, the best reversible capacity and the smallest polarization are obtained for the battery 2a.

The batteries 7a and 8a, the electrolyte of which contains vinylene carbonate, produce results which are not as good as for the battery 2a.

The poorest result is obtained with the battery 1a, which has a significant polarization and a very small reversible capacity.

Variants of the Invention

Four batteries were prepared as variants of the invention. These are the batteries 2b, 2c, 3b and 3c. The batteries 2b, 2c were prepared in the same way as the battery 2a except for the fact that the proportions by volume of the different solvents were modified. The batteries 3b and 3c were prepared in the same way as the battery 3a except for the fact that the proportions by volume of the different solvents were modified. The battery 1b was manufactured and tested as was the battery 1a as a comparison with the batteries of the invention.

Table 3 shows the compositions of the mixtures of solvents used.

TABLE 3

Composition of the mixtures of solvents for the batteries

| Reference | Composition of the mixture of solvents |
| --- | --- |
| Battery 1a | EC/DMC/EA (15/25/60) + 2% VC |
| Battery 1b | EC/DMC/EA (20/20/60) + 4% VC |
| Battery 2a | F1EC/DMC/EA (15/25/60) without VC |
| Battery 2b | F1EC/DMC/EA (20/20/60) without VC |
| Battery 2c | F1EC/DMC/EA (10/5/85) without VC |
| Battery 3a | EC/F1DMC/EA (15/25/60) without VC |
| Battery 3b | EC/F1DMC/EA (20/20/60) without VC |
| Battery 3c | EC/F1DMC/EA (10/5/85) without VC |

Partial charging tests and partial cycle tests were carried out at −30° C. for these batteries.

Figure 10A:
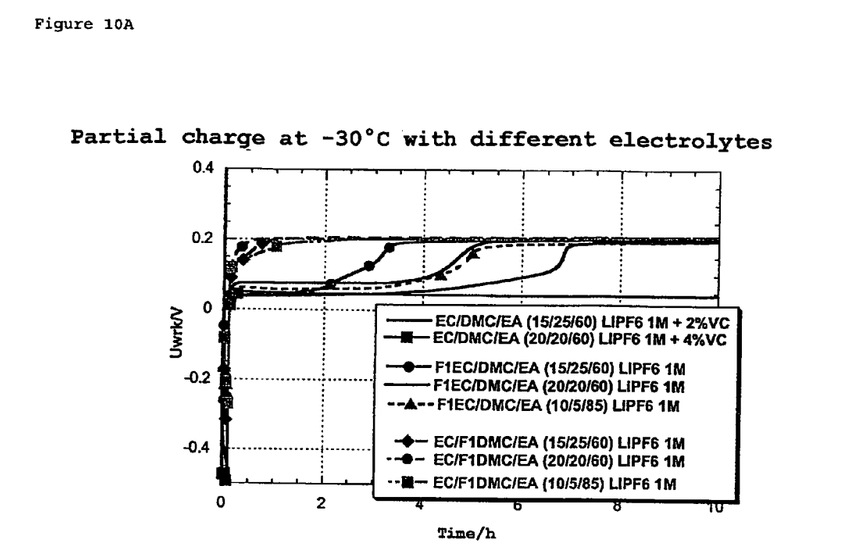
FIG. 10A represents the variation in the voltage of batteries, filled with different electrolytes, after a partial charging to 10% of capacity, at a rate of C, at −30° C.

The results of the partial charging tests are represented in FIG. 10A. The shortest lithium reinsertion times are obtained for the batteries 3a, 3b and 3c filled with a mixture of solvents EC/F1DMC/EA. These batteries do not have a lithium deposit. Among the batteries 2a, 2b and 2c, the battery having the smallest lithium deposit is the battery 2a comprising a mixture of solvents F1EC/DMC/EA in the proportions 15/25/60.

Figure 10B:
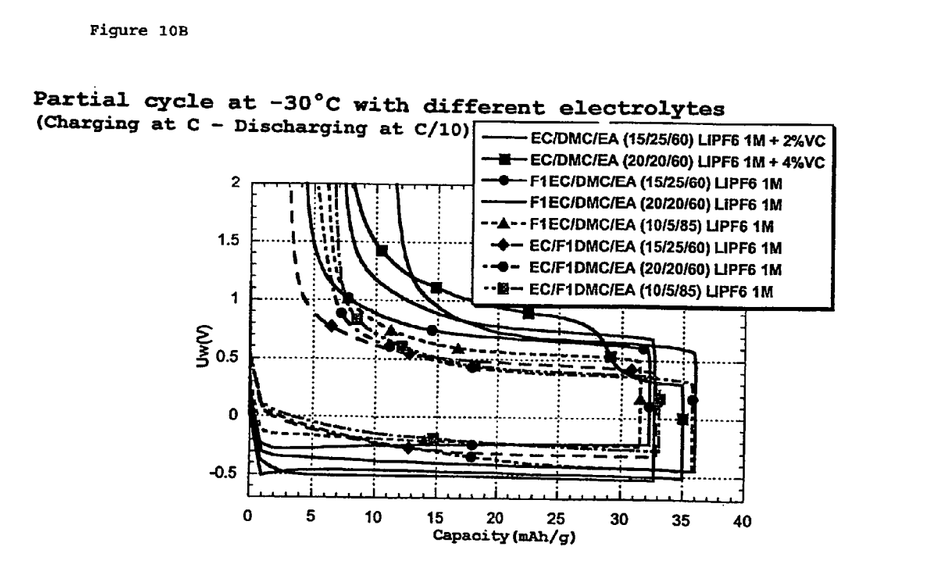
FIG. 10B represents the variation in the voltage of these batteries during a partial cycle at −30° C. (charging at C—discharging at C/10).

The results of the partial cycle tests are represented in FIG. 10B. It is noted that the difference between the charging voltage and the discharging voltage is smaller for the batteries 2a, 2b, 2c, 3a, 3b and 3c filled with an electrolyte according to the invention than for the batteries 1a and 1b which are not a part of the invention. The batteries 2a, 3b and 3c therefore have the lowest polarization resistance.

The use of an electrolyte according to the invention therefore makes it possible to significantly reduce the polarization of the negative electrode.

The present embodiment and the figures should be seen to be presented by way of non-restrictive example, and the invention is not intended to be limited to the details provided here but can be modified whilst remaining within the scope of the attached claims. In particular, the substituted carbonate can be plurisubstituted by a halogen.

The invention claimed is:

1. Mixture of solvents comprising with respect to the volume of said mixture,
   50 to 95% by volume of a linear ester of a $C_2$ to $C_6$ saturated acid, and
   5 to 50% by volume of a $C_3$ to $C_6$ saturated cyclic carbonate and a $C_3$ to $C_6$ saturated linear carbonate, only the $C_3$ to $C_6$ saturated linear carbonate being substituted by at least one halogen atom.

2. Mixture of solvents according to claim 1, in which the substituted carbonate is monosubstituted.

3. Mixture of solvents according to claim 1, in which the at least one halogen atom is fluorine.

4. Mixture of solvents according to claim 1, in which said linear ester is chosen from the group consisting of ethyl acetate, methyl acetate, propyl acetate, ethyl butyrate, methyl butyrate, propyl butyrate, ethyl propionate, methyl propionate, propyl propionate.

5. Mixture of solvents according to claim 4, in which said linear ester is ethyl acetate.

6. Mixture of solvents according to claim 1, in which the saturated cyclic carbonate is chosen from the group consisting of ethylene carbonate, propylene carbonate and butylene carbonate.

7. Mixture of solvents according to claim 6, in which the saturated cyclic carbonate is ethylene carbonate.

8. Mixture of solvents according to claim 1, in which the saturated linear carbonate is chosen from the group consisting of dimethyl carbonate, diethyl carbonate, methyl ethyl carbonate and methyl propyl carbonate.

9. Mixture of solvents according to claim 8, in which the saturated linear carbonate is dimethyl carbonate.

10. Mixture of solvents according to claim 1, in which the proportion by volume of linear ester is 60 to 85% in relation to the total volume of solvent.

11. Mixture of solvents according to claim 1, in which the proportion by volume of saturated cyclic carbonate is 3 to 30% in relation to the total volume of solvent.

12. Mixture of solvents according to claim 11, in which the proportion by volume of saturated cyclic carbonate is 10 to 20% in relation to the total volume of solvent.

13. Mixture of solvents: according to claim 1, in which the proportion by volume of saturated linear carbonate is 3 to 30% in relation 15 to the total volume of solvent.

14. Mixture of solvents according to claim 13, in which the proportion by volume of saturated linear carbonate is 5 to 25% in relation to the total volume of solvent.

15. Mixture of solvents according to claim 1, not comprising unsaturated cyclic carbonate.

16. Mixture of solvents according to claim 1, constituted by ethylene carbonate, monofluorinated dimethyl carbonate and ethyl acetate in which the proportions by volume of ethylene carbonate, monofluorinated dimethyl carbonate and ethyl acetate are respectively 10-20%, 20-30% and 50-70%.

17. Mixture of solvents according to claim 1, constituted by monofluorinated ethylene carbonate, dimethyl carbonate and ethyl acetate in which the proportions by volume of monofluorinated ethylene carbonate, dimethyl carbonate and ethyl acetate are respectively 10-20%, 20-30% and 50-70%.

18. Liquid electrolyte comprising a lithium salt dissolved in a mixture of solvents according to claim 1.

19. Lithium battery comprising:
   at least one positive electrode,
   at least one negative electrode containing a binder and an electrochemically active material which is a carbon capable of inserting lithium ions,
   and a liquid electrolyte according to claim 18.

20. Battery according to claim 19, in which the binder is a non-fluorinated polymer.

21. Battery according to claim 20, in which the polymer is chosen from the group consisting of styrene and butadiene copolymer, acrylonitrile and butadiene copolymer, acrylic acid homopolymer, carboxymethyl cellulose and mixtures thereof.

22. Battery according to claim 21, in which the polymer is a mixture of a styrene and butadiene copolymer and carboxymethyl cellulose.

23. Battery according to claim 19, which is able to operate at temperatures of up to approximately −60° C.

* * * * *